United States Patent
Zhao et al.

(10) Patent No.: US 9,445,096 B2
(45) Date of Patent: *Sep. 13, 2016

(54) METHODS, DEVICES AND SYSTEMS FOR PARALLEL VIDEO ENCODING AND DECODING

(71) Applicant: DOLBY INTERNATIONAL AB, Amsterdam Zuidoost (NL)

(72) Inventors: Jie Zhao, Camas (CN); Christopher A. Segall, Camas, WA (US); Louis J. Kerofsky, Camas, WA (US)

(73) Assignee: DOLBY INTERNATIONAL AB, Amsterdam Zuidoost (NL)

( * ) Notice: Subject to any disclaimer, the term of this patent is extended or adjusted under 35 U.S.C. 154(b) by 79 days.

This patent is subject to a terminal disclaimer.

(21) Appl. No.: 14/269,755

(22) Filed: May 5, 2014

(65) Prior Publication Data
US 2014/0241438 A1    Aug. 28, 2014

Related U.S. Application Data

(60) Division of application No. 12/934,938, filed as application No. PCT/JP2009/056778 on Mar. 25, 2009, now Pat. No. 8,824,541, which is a continuation of application No. 12/058,301, filed on Mar. 28, 2008, now Pat. No. 8,542,748.

(51) Int. Cl.
*H04N 19/00* (2014.01)
*H04N 19/91* (2014.01)
(Continued)

(52) U.S. Cl.
CPC ........ *H04N 19/00951* (2013.01); *H04N 19/17* (2014.11); *H04N 19/174* (2014.11); *H04N 19/436* (2014.11); *H04N 19/44* (2014.11);
(Continued)

(58) Field of Classification Search
None
See application file for complete search history.

(56) References Cited

U.S. PATENT DOCUMENTS

| 5,557,332 A | 9/1996 | Koyanagi et al. |
| 5,809,176 A | 9/1998 | Yajima |

(Continued)

FOREIGN PATENT DOCUMENTS

| JP | 7-23397 A | 1/1995 |
| JP | 8-116534 A | 5/1996 |

(Continued)

OTHER PUBLICATIONS

Chinese Office Action, dated Apr. 18, 2012, for Chinese Application No. 200980110928.2.

(Continued)

*Primary Examiner* — Sath V Perungavoor
*Assistant Examiner* — Peter D Le
(74) *Attorney, Agent, or Firm* — Fish & Richardson P.C.

(57) ABSTRACT

A method for decoding a video bitstream is disclosed. The method comprises: entropy decoding a first portion of a video bitstream, wherein first portion of video bitstream is associated with a video frame, thereby producing a first portion of decoded data; entropy decoding a second portion of video bitstream, wherein second portion of video bitstream is associated with video frame, thereby producing a second portion of decoded data, wherein entropy decoding second portion of video bitstream is independent of entropy decoding first portion of video bitstream; and reconstructing a first portion of video frame associated with video bitstream using first portion of decoded data and second portion of decoded data.

1 Claim, 9 Drawing Sheets

(51) Int. Cl.
   *H04N 19/70*   (2014.01)
   *H04N 19/46*   (2014.01)
   *H04N 19/61*   (2014.01)
   *H04N 19/174*  (2014.01)
   *H04N 19/17*   (2014.01)
   *H04N 19/44*   (2014.01)
   *H04N 19/436*  (2014.01)

(52) U.S. Cl.
   CPC .............. *H04N19/46* (2014.11); *H04N 19/61* (2014.11); *H04N 19/70* (2014.11); *H04N 19/91* (2014.11)

(56) References Cited

U.S. PATENT DOCUMENTS

| | | |
|---|---|---|
| 6,351,570 B1 | 2/2002 | Kobayashi |
| 6,404,817 B1 | 6/2002 | Saha et al. |
| 7,061,410 B1 | 6/2006 | Pearson et al. |
| 7,262,722 B1 | 8/2007 | Jahanghir et al. |
| 7,289,673 B2 | 10/2007 | Lin et al. |
| 7,305,036 B2 | 12/2007 | MacInnis et al. |
| 7,408,488 B2 | 8/2008 | Sekiguchi et al. |
| 7,460,041 B2 | 12/2008 | Yang et al. |
| 7,480,335 B2 | 1/2009 | Payson |
| 7,525,456 B2 | 4/2009 | Watanabe |
| 7,586,924 B2 | 9/2009 | Wiegand |
| 7,630,565 B2 | 12/2009 | Linzer |
| 7,636,395 B2 | 12/2009 | Yongfang et al. |
| 7,656,320 B2 | 2/2010 | Schneider |
| 7,813,431 B2 | 10/2010 | Macinnis |
| 7,843,997 B2 | 11/2010 | Hellman |
| 7,925,099 B2 | 4/2011 | Ramirez et al. |
| 7,937,397 B2 | 5/2011 | Pickens |
| 2002/0057739 A1 | 5/2002 | Hasebe et al. |
| 2003/0189982 A1 | 10/2003 | MacInnis |
| 2004/0008766 A1 | 1/2004 | Wang et al. |
| 2004/0066852 A1 | 4/2004 | MacInnis |
| 2004/0228410 A1 | 11/2004 | Ameres et al. |
| 2004/0258162 A1 | 12/2004 | Gordon et al. |
| 2004/0268329 A1 | 12/2004 | Prakasam |
| 2005/0074176 A1 | 4/2005 | Marpe et al. |
| 2005/0123207 A1 | 6/2005 | Marpe et al. |
| 2006/0013318 A1 | 1/2006 | Webb et al. |
| 2006/0126744 A1 | 6/2006 | Peng et al. |
| 2006/0176953 A1 | 8/2006 | Mohsenian |
| 2006/0233254 A1 | 10/2006 | Lee et al. |
| 2007/0009047 A1 | 1/2007 | Shim et al. |
| 2007/0133678 A1 | 6/2007 | Sakai |
| 2007/0183491 A1 | 8/2007 | Pearson et al. |
| 2007/0230567 A1 | 10/2007 | Wang et al. |
| 2007/0242894 A1 | 10/2007 | Kautzer et al. |
| 2007/0280345 A1 | 12/2007 | Tu et al. |
| 2008/0013622 A1 | 1/2008 | Bao et al. |
| 2008/0013633 A1 | 1/2008 | Ye et al. |
| 2008/0056389 A1 | 3/2008 | Chiang et al. |
| 2008/0063082 A1 | 3/2008 | Watanabe et al. |
| 2008/0112489 A1 | 5/2008 | Malladi et al. |
| 2008/0170615 A1 | 7/2008 | Sekiguchi et al. |
| 2008/0181298 A1 | 7/2008 | Shi et al. |
| 2008/0181304 A1 | 7/2008 | Sekiguchi et al. |
| 2008/0187053 A1 | 8/2008 | Zhao et al. |
| 2008/0199094 A1 | 8/2008 | Choi et al. |
| 2008/0219349 A1 | 9/2008 | Huang et al. |
| 2008/0240233 A1 | 10/2008 | Au et al. |
| 2008/0262312 A1 | 10/2008 | Carroll et al. |
| 2008/0310504 A1 | 12/2008 | Ye et al. |
| 2008/0310512 A1 | 12/2008 | Ye et al. |
| 2008/0310745 A1 | 12/2008 | Ye et al. |
| 2009/0079602 A1 | 3/2009 | Sze et al. |
| 2009/0175349 A1 | 7/2009 | Ye et al. |
| 2009/0196343 A1 | 8/2009 | Cho et al. |
| 2009/0196355 A1 | 8/2009 | Kao et al. |
| 2009/0245349 A1 | 10/2009 | Zhao et al. |
| 2009/0274382 A1 | 11/2009 | Lin et al. |
| 2009/0279604 A1 | 11/2009 | Chono et al. |
| 2010/0020866 A1 | 1/2010 | Marpe et al. |
| 2010/0040138 A1 | 2/2010 | Marpe et al. |
| 2010/0098155 A1 | 4/2010 | Demircin et al. |
| 2010/0124286 A1 | 5/2010 | Wang |
| 2010/0135416 A1 | 6/2010 | Huang et al. |
| 2010/0142618 A1 | 6/2010 | Pandit et al. |
| 2010/0172593 A1 | 7/2010 | Chono |
| 2010/0238998 A1 | 9/2010 | Nanbu et al. |
| 2010/0266049 A1 | 10/2010 | Hashimoto et al. |
| 2011/0026604 A1 | 2/2011 | Zhao et al. |
| 2011/0200115 A1 | 8/2011 | Hayashi et al. |
| 2011/0206135 A1 | 8/2011 | Drugeon et al. |

FOREIGN PATENT DOCUMENTS

| | | |
|---|---|---|
| JP | 2002-199392 A | 7/2002 |
| JP | 2006-14113 A | 1/2006 |
| JP | 2006-246524 A | 9/2006 |
| JP | 2007-166192 A | 6/2007 |
| JP | 2007-520912 A | 7/2007 |
| JP | 2007-201938 A | 8/2007 |
| JP | 2007-300455 A | 11/2007 |
| JP | 2008-172599 A | 7/2008 |
| WO | WO 2006/051796 A1 | 5/2006 |
| WO | WO 2007/136093 A1 | 11/2007 |
| WO | WO 2009/119888 A1 | 10/2009 |
| WO | WO 2010/095528 A1 | 8/2010 |

OTHER PUBLICATIONS

Chinese Office Action, dated Jun. 27, 2013, for Chinese Application No. 200980110928.2.

European Search Report, dated Feb. 15, 2011, for European Application No. 09725979.0.

Ghandi et al., "The H.264/AVC Video Coding Standard for the Next Generation Multimedia Communication", IAEEE Journal, 2004, pp. 1-10.

International Search Report and Written Opinion of the International Search Authority (corrected versions), dated Jun. 23, 2009, for International Application No. PCT/JP2009/056778.

International Search Report and Written Opinion of the International Searching Authority, dated Dec. 27, 2011, for International Application No. PCT/JP2011/073150.

International Search Report, dated Dec. 7, 2010, for International Application No. PCT/JP2011/068541.

International Search Report, dated Jan. 10, 2012, for International Application No. PCT/JP2011/073156.

International Search Report, dated Oct. 25, 2011, for International Application No. PCT/JP2011/066633.

International Search Report, dated Oct. 25, 2011, for International Application No. PCT/JP2011/066634.

ISO/IEC 14496-10, "Information technology—Coding of audio-visual objects: Part 10: Advanced Video Coding", International Standard, Second Edition, Oct. 1, 2004, 280 pages.

ITU-T, "Advanced video coding for generic audiovisual services", Telecommunication Standardization Sector of ITU, ITU-T Rec, H.264, Nov. 2007, 562 pages.

ITU-T, "Advanced video coding for generic audiovisual services", Telecommunication Standardization Sector of ITU, H.264, Mar. 2010, 676 pages provided.

Japanese Office Action, dated May 8, 2012, for Japanese Application No. 2010-537070.

JCT-VC, "Test Model under Consideration" Joint Collaborative Team on Video Coding (JCT-VC) of ITU-T SG16 WP3 and ISO/IEC JTC1/SC29/WG11, JCTVC-A205, Apr. 15-23, 2010, 898 pages provided.

Marpe et al."Context-Based Adaptive Binary Arithmetic Coding in the H.264/AVC Video Compression Standard" IEEE Transactions on Circuits and Systems for Video Technology, vol. 13, No. 7, Jul. 2003, pp. 620-636.

Misra et al., "Entropy Slices for Parallel Entropy Coding", Sharp, Joint Collaborative Team on Video Coding (JCT-VC) of ITU-T SG16 WP3 and ISO/IEC JTC1/SC29/WG11, JCTVC-B111, Jul. 21-28, 2010, 6 pages provided.

(56) References Cited

OTHER PUBLICATIONS

Puri et al., "Video coding using the H.264/MPEG-4 AVC compression standard", Image Communication, vol. 19, 2004, pp. 793-849.
Russian Office Action, dated Apr. 2, 2013, for Russian Application No. 2010142914.
Segall et al., "A Highly Efficient and Highly Parallel System for Video Coding", Sharp Corporation, Joint Collaborative Team on Video Coding (JCT-VC) of ITU-T SG16 WP3 and ISO/IEC JTC1/SC29/WG11, JCTVC-A105, Apr. 15-23, 2010, 49 pages provided.
Sharp, "Entrophy slices for parallel entropy decoding", Telecommunication Standardization Sector, International Telecommunication Union, COM 16—C 405—E, pp. 1-9, Apr. 2008.
Sullivan et al., "Editor's Text for ISO/IEC 14496-10:2005 (AVC 3rd Edition)," International Organisation for Standardisation, Organisation Internationale de Normalisation, ISO/IEC JTC1/SC29/WG11, Coding of Moving Pictures and Audio, 2005, 334 pages.
United States Notice of Allowance, dated Aug. 21, 2012, for U.S. Appl. No. 12/895,676.
United States Notice of Allowance, dated Feb. 12, 2014, for U.S. Appl. No. 12/934,938.
United States Notice of Allowance, dated May 15, 2013, for U.S. Appl. No. 12/058,301.
United States Office Action, dated Dec. 21, 2011, for U.S. Appl. No. 12/895,676.
United States Office Action, dated Feb. 1, 2012, for U.S. Appl. No. 12/058,301.
United States Office Action, dated Jan. 12, 2012, for U.S. Appl. No. 12/579,236.
United States Office Action, dated Jan. 3, 2013, for U.S. Appl. No. 12/934,938.
United States Office Action, dated Jan. 7, 2013, for U.S. Appl. No. 12/837,337.
United States Office Action, dated Jul. 2, 2013, for U.S. Appl. No. 12/579,236.
United States Office Action, dated Jul. 22, 2011, for U.S. Appl. No. 12/058,301.
United States Office Action, dated May 14, 2013, for U.S. Appl. No. 12/934,938.
United States Office Action, dated May 22, 2013, for U.S. Appl. No. 12/896,778.
United States Office Action, dated May 23, 2012, for U.S. Appl. No. 12/579,236.
United States Office Action, dated May 24, 2012, for U.S. Appl. No. 12/837,337.
United States Office Action, dated Sep. 19, 2012, for U.S. Appl. No. 12/836,507.
United States Office Action, dated Sep. 25, 2013, for U.S. Appl. No. 12/934,938.
United States Office Action, dated Sep. 5, 2012, for U.S. Appl. No. 12/895,676.
Van Der Tol et al., "Mapping of H.264 decoding on a multiprocesor architecture," Image and Video Communications and Processing (Proceedings Volume), vol. 5022, 2003, pp. 707-718.
Winken et al., "Description of video coding technology proposal by Fraunhofer HHI", Fraunhofer HHI, Joint Collaborative Team on Video Coding (JCT-VC) of ITU-T SG16 WP3 and ISO/IEC JTC1/SC29/WG11, JCTVC-A116, Apr. 15-23, 2010, 44 pages provided.
Zhang et al., "Variable-Bin-Rate CABAC Engine for H.264/AVC High Definition Real-Time Decoding", IEEE Transactions on Very Large Scale Integration (VLSI) Systems, vol. 17, No. 3, Mar. 2009, pp. 417-426.
Zhao et al., "New Results using Entropy Slices for Parallel Decoding," ITU—Telecommunications Standardization Sector, Study Group 16, Question 6, Video Coding Experts Group (VCEG), Jul. 16-18, 2008, 9 pages.
Zhao et al., "Parallel entropy decoding for high-resolution video coding," Proc. SPIE-IS&T, vol. 7257, 2009, pp. 725706-1 to 725706-11.
United States Advisory Action, dated Aug. 7, 2013, for U.S. Appl. No. 12/934,938.
Chinese Office Action, Application No. 20090110928.2, Jun. 27, 2013.
European Patent Office—Office Action—Application No. 09 725 979.0—Dated May 14, 2013.
International Search Report—International Patent Application No. PCT /JP2011 /073150—Mailing Date Dec. 27, 2011.
Joint Collaborative Team on Video Coding (JCT-VG) of ITU-T SG16 WP3 and ISO/IEC JTC1/SC29/ WG11, "Test Model under Consideration," Document: JCTVC-A205, Jun. 6, 2010.
Tol et al., "Mapping of H.264 decoding on a multiprocessor architecture," Dec. 7, 2005, Philips Research Laboratories pp. 1-12.
Zhang et al., "Variable-Bin-Rate CABAC Engine for H.264/AVC High Definition Real-Time Decoding," IEEE Transactions on Very Large Scale Integration (VLSI) Systems, Feb. 2009, pp. 417-426, vol. 17 No. 3, IEEE Educational Activities Department Piscataway, NJ, USA.
Zhao, Jie et al., "Parallel entropy decoding for high-resolution video coding," Proc. SPIE, vol. 7257, pp. 725705-1 to 725705-11, Nov. 25, 2010.
Halabach: "Reduced slice headers and bit error resilience," 3. JVT Meeting; 60. MPEG Meeting; Jun. 5, 2002-Oct. 5, 2002; Fairfax; (Joint Video Team of ISO/IEC JTC1/SC29), May 10, 2002, 12 pages.
Ichimura D et al: "Stream Structure and CABAC for Interactive. ROI scalability, "17. JVT Meeting; 74. MPEG Meeting; Oct. 14, 2005-Oct. 21, 2005; NICE, FR; (Joint Video Ream of ISO/IEC JTC1/SC29/WG11 and ITU-T SG.16), No. JVT-Q021r1, Oct. 14, 2005, 12 pages.

E_SLICE #0

E_SLICE #1

E_SLICE #2

METHODS, DEVICES AND SYSTEMS FOR PARALLEL VIDEO ENCODING AND DECODING

This application is a divisional of co-pending U.S. application Ser. No. 12/934,938 filed on Sep. 27, 2010 and for which priority is claimed under 35 U.S.C. §120. U.S. application Ser. No. 12/934,938 is the National Phase of PCT International Application No. PCT/JP2009/056778 filed on Mar. 25, 2009 under 35 U.S.C. §371. U.S. application Ser. No. 12/934,938 also claims priority under 35 U.S.C. §120 to U.S. Non-Provisional application Ser. No. 12/058,301 filed on Mar. 28, 2008, and for which the entire contents of each of the above-identified applications are hereby expressly incorporated by reference into the present application.

TECHNICAL FIELD

Embodiments of the present invention relate generally to video coding.

BACKGROUND ART

State-of-the-art video-coding methods and standards, for example H.264/MPEG-4 AVC (H.264/AVC), may provide higher coding efficiency than older methods and standards at the expense of higher complexity. Increasing quality requirements and resolution requirements on video coding methods and standards may also increase their complexity. Decoders that support parallel decoding may improve decoding speeds and reduce memory requirements. Additionally, advances in multi-core processors may make encoders and decoders that support parallel decoding desirable.

H.264/MPEG-4 AVC [Joint Video Team of ITU-T VCEG and ISO/IEC MPEG, "H.264: Advanced video coding for generic audiovisual services," ITU-T Rec. H.264 and ISO/IEC 14496-10 (MPEG4—Part 10), November 2007], which is hereby incorporated by reference herein in its entirety, is a video codec specification that uses macroblock prediction followed by residual coding to reduce temporal and spatial redundancy in a video sequence for compression efficiency.

DISCLOSURE OF THE INVENTION

Some embodiments of the present invention comprise methods, devices and systems for parallel entropy encoding and decoding of a video bitstream based on partitioning of data into entropy slices that may be entropy encoded and decoded independently.

According to one aspect of the present application, a method for decoding a video bitstream is provided. The method comprises: entropy decoding a first portion of a video bitstream, wherein first portion of video bitstream is associated with a video frame, thereby producing a first portion of decoded data; entropy decoding a second portion of video bitstream, wherein second portion of video bitstream is associated with video frame, thereby producing a second portion of decoded data, wherein entropy decoding second portion of video bitstream is independent of entropy decoding first portion of video bitstream; and reconstructing a first portion of video frame associated with video bitstream using first portion of decoded data and second portion of decoded data.

According to another aspect of the present application, a method for decoding a video frame in a video sequence is provided. The method comprises receiving a bitstream; identifying a reconstruction slice in bitstream; identifying a plurality of entropy slices associated with reconstruction slice in bitstream; entropy decoding each of plurality of entropy slices associated with reconstruction slice, thereby producing a plurality of entropy-decoded entropy slices; and reconstructing a portion of a video frame associated with reconstruction slice using plurality of entropy-decoded entropy slices.

According to another aspect of the present application, a method for encoding a video frame in a video sequence is provided. The method comprises: partitioning a first frame in a video sequence into at least one reconstruction slice, thereby producing a first reconstruction slice; and partitioning first reconstruction slice into a plurality of entropy slices.

According to another aspect of the present application, a method for generating a video bitstream for parallel decoding is disclosed. The method comprises: receiving a first video bitstream; identifying a reconstruction slice in video bitstream; entropy decoding a plurality of symbols from reconstruction slice, thereby producing entropy-decoded data associated with reconstruction slice; partitioning entropy-decoded data associated with reconstruction slice into a plurality of entropy slices associated with reconstruction slice; independently entropy encoding the entropy-decoded data of each entropy slice of plurality of entropy slices, thereby producing a plurality of entropy-encoded entropy slices; and generating a second video bitstream comprising plurality of entropy-encoded entropy slices.

In some embodiments of the present invention, a first portion and second portion of an input compressed-video bitstream may be entropy decoded independently. A block of samples of a video frame associated with the second portion of the input compressed-video bitstream may be reconstructed using decoded data from the first portion and the second portion. Thus, the reconstruction neighbor definition and the entropy decoding neighbor definition are not the same.

In some embodiments of the present invention, an encoder may partition input data into entropy slices. The encoder may entropy encode the entropy slices independently. The encoder may form a bitstream comprising entropy-slice headers each of which may indicate the location in the bitstream of the associated data for the entropy slice. In some embodiments of the present invention, a decoder may parse a received bitstream for entropy-slice headers, and the decoder may entropy decode a plurality of entropy slices according to a decoder-defined level of parallelism.

In some embodiments of the present invention, data may be multiplexed at a picture level to form entropy slices. In some embodiments, one, or more, entropy slices may correspond to prediction data, and one, or more, entropy slices may correspond to residual data. In alternative embodiments of the present invention, one, or more, entropy slices may correspond to each of a plurality of color planes.

In some embodiments of the present invention, a bitstream may be transcoded to comprise entropy slices. In these embodiments, a received bitstream may be entropy decoded, a plurality of entropy slices may be constructed, and each of the entropy slices may be independent encoded and written to a transcoded bitstream with an associated entropy-slice header.

The foregoing and other objectives, features, and advantages of the invention will be more readily understood upon

REFERENCE NUMERALS

2 H.264/AVC VIDEO ENCODER
32 ENTROPY ENCODING
54 ENTROPY DECODING
80 H.264/AVC VIDEO DECODER
110 VIDEO FRAME
111,112,113 RECONSTRUCTION SLICE
112-1,112-2, 112-3 ENTROPY SLICE
115,116,117,118,119,120,121,122,123 MACROBLOCK

BEST MODE FOR CARRYING OUT THE INVENTION

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods, devices and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

While any video coder/decoder (codec) that uses entropy encoding/decoding may be accommodated by embodiments of the present invention, exemplary embodiments of the present invention will be illustrated in relation to an H.264/AVC encoder and an H.264/AVC decoder. This is intended for illustration of embodiments of the present invention and not limitation.

State-of-the-art video-coding methods and standards, for example H.264/AVC, may provide higher coding efficiency than older methods and standards at the expense of higher complexity. Increasing quality requirements and resolution requirements on video coding methods and standards may also increase their complexity. Decoders that support parallel decoding may improve decoding speeds and reduce memory requirements. Additionally, advances in multi-core processors may make encoders and decoders that support parallel decoding desirable.

H.264/AVC, and many other video coding standards and methods, are based on a block-based hybrid video-coding approach, wherein the source-coding algorithm is a hybrid of inter-picture, also considered inter-frame, prediction, intra-picture, also considered intra-frame, prediction and transform coding of a prediction residual. Inter-frame prediction may exploit temporal redundancies, and intra-frame and transform coding of the prediction residual may exploit spatial redundancies.

Figure 1:
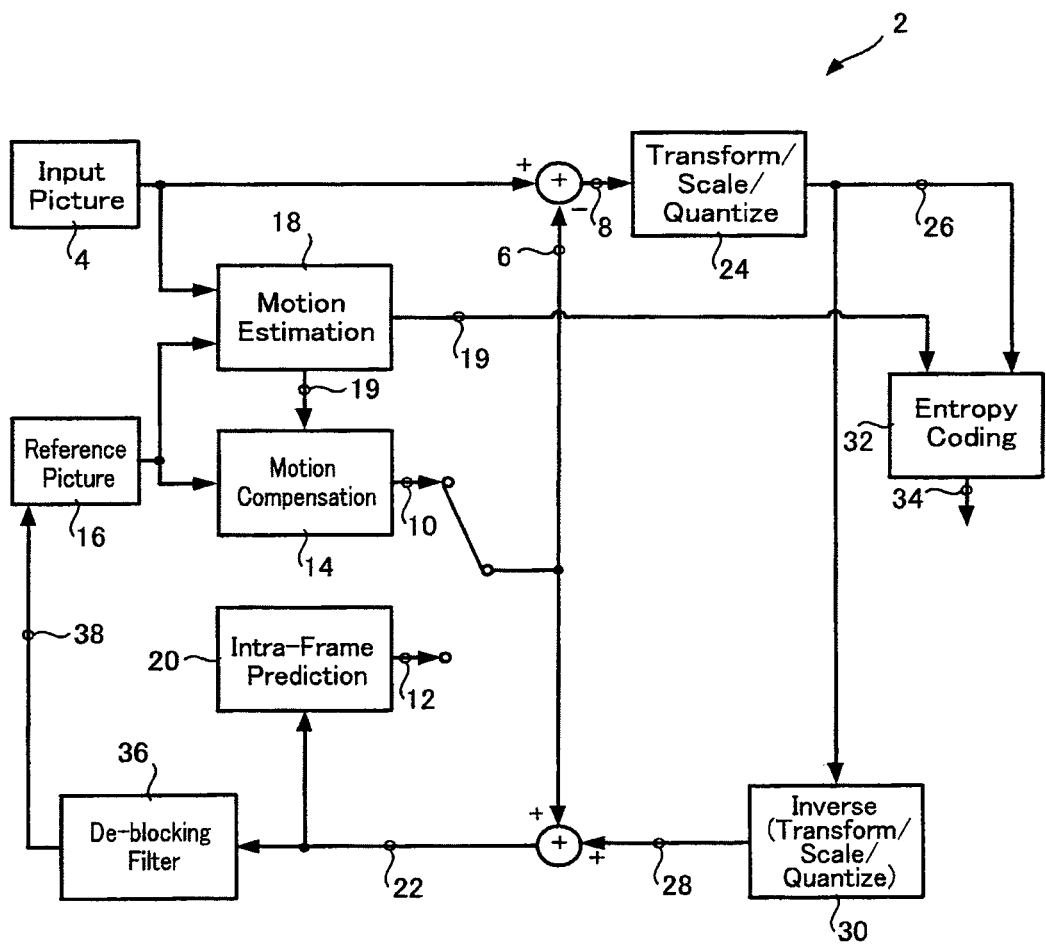
FIG. 1 is a picture showing an H.264/AVC video encoder (prior art)

FIG. 1 shows a block diagram of an exemplary H.264/AVC video encoder 2. An input picture 4, also considered an input frame, may be presented for encoding. A predicted signal 6 and a residual signal 8 may be produced, wherein the predicted signal 6 may be based on either an inter-frame prediction 10 or an intra-frame prediction 12. The inter-frame prediction 10 may be determined by motion compensating 14 using a stored, reference picture 16, also considered reference frame, using motion information 19 determined by a motion estimation 18 process between the input frame(input picture) 4 and the reference frame(reference picture) 16. The intra-frame prediction 12 may be determined by intra-frame prediction 20 using a decoded signal 22. The residual signal 8 may be determined by subtracting the input frame 4 from the prediction (predicted signal) 6. The residual signal 8 is transformed, scaled and quantized 24, thereby producing quantized, transform coefficients 26. The decoded signal 22 may be generated by adding the predicted signal 6 to a signal 28 generated by inverse transforming, scaling and inverse quantizing 30 the quantized, transform coefficients 26. The motion information 19 and the quantized, transform coefficients 26 may be entropy coded 32 and written to the compressed-video bitstream 34. An output image region 38, for example a portion of the reference frame, may be generated at the encoder 2 by filtering 36 the reconstructed, pre-filtered signal (decoded signal) 22.

Figure 2:
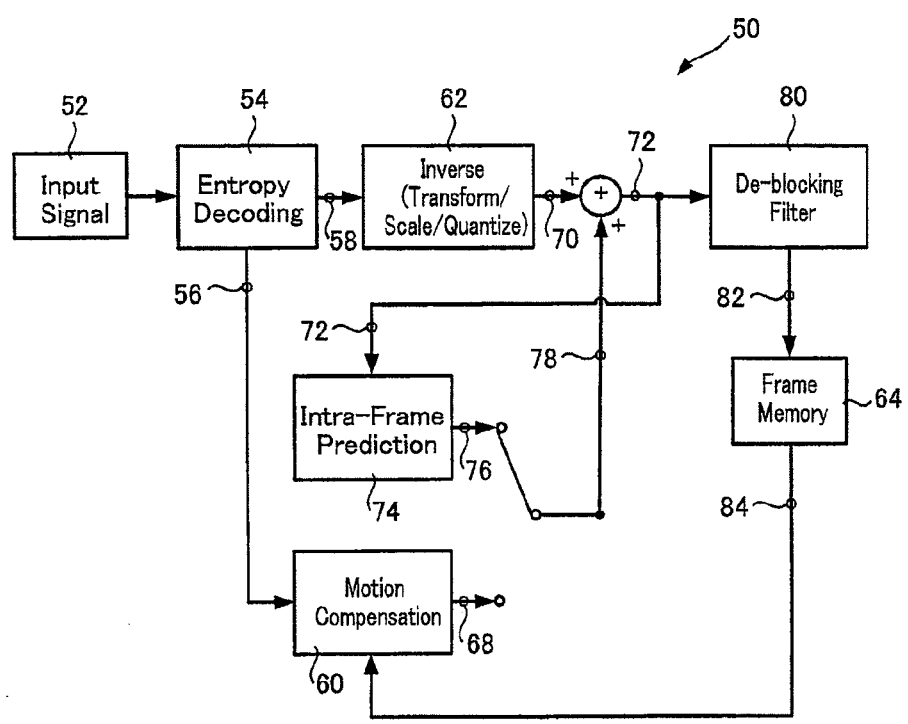
FIG. 2 is a picture showing an H.264/AVC video decoder (prior art)

FIG. 2 shows a block diagram of an exemplary H.264/AVC video decoder 50. An input signal 52, also considered a bitstream, may be presented for decoding. Received symbols may be entropy decoded 54, thereby producing motion information 56 and quantized, scaled, transform coefficients 58. The motion information 56 may be combined by motion compensation 60 with a portion of a reference frame 84 which may reside in frame memory 64, and an inter-frame prediction 68 may be generated. The quantized, scaled, transform coefficients 58 may be inversely quantized, inversely scaled and inversely transformed 62, thereby producing a decoded residual signal 70. The residual signal 70 may be added to a prediction signal 78: either the inter-frame prediction signal 68 or an intra-frame prediction signal 76, and become combined signal 72. The intra-frame prediction signal 76 may be predicted by intra-frame prediction 74 from previously decoded information (previously combined signal) 72 in the current frame. The combined signal 72 may be filtered by de-blocking filter 80 and the filtered signal 82 may be written to frame memory 64.

In H.264/AVC, an input picture is partitioned into fixed-size macroblocks, wherein each macroblock covers a rectangular picture area of 16×16 samples of the luma component and 8×8 samples of each of the two chroma components. The decoding process of the H.264/AVC standard is specified for processing units which are macroblocks. The entropy decoder 54 parses the syntax elements of the compressed-video bitstream 52 and de-multiplexes them. H.264/AVC specifies two alternative methods of entropy decoding: a low-complexity technique that is based on the usage of context-adaptively switched sets of variable length codes, referred to as CAVLC, and a computationally more demanding algorithm of context-based adaptively binary arithmetic coding, referred to as CABAC. In both entropy decoding methods, decoding of a current symbol may rely on previously, correctly decoded symbols and adaptively updated context models. In addition, different data information, for example, prediction data information, residual data information and different color planes, may be multiplexed together. De-multiplexing may not be done until elements are entropy decoded.

After entropy decoding, a macroblock may be reconstructed by obtaining: the residual signal through inverse quantization and the inverse transform, and the prediction signal, either the intra-frame prediction signal or the inter-frame prediction signal. Blocking distortion may be reduced by applying a de-blocking filter to every decoded macroblock. No processing may begin until the input signal is entropy decoded, thereby making entropy decoding a potential bottleneck in decoding.

Similarly, in codecs in which alternative prediction mechanisms may be allowed, for example, inter-layer prediction in H.264/AVC or inter-layer prediction in other scalable codecs, entropy decoding may be requisite prior to all processing at the decoder, thereby making entropy decoding a potential bottleneck.

In H.264/AVC, an input picture comprising a plurality of macroblocks may be partitioned into one or several slices. The values of the samples in the area of the picture that a slice represents may be correctly decoded without the use of data from other slices provided that the reference pictures used at the encoder and the decoder are identical. Therefore, entropy decoding and macroblock reconstruction for a slice do not depend on other slices. In particular, the entropy coding state is reset at the start of each slice. The data in other slices are marked as unavailable when defining neighborhood availability for both entropy decoding and reconstruction. In H.264/AVC, slices may be entropy decoded and reconstructed in parallel. No intra prediction and motion-vector prediction are allowed across the slice boundary. De-blocking filtering may use information across slice boundaries.

Figure 3:
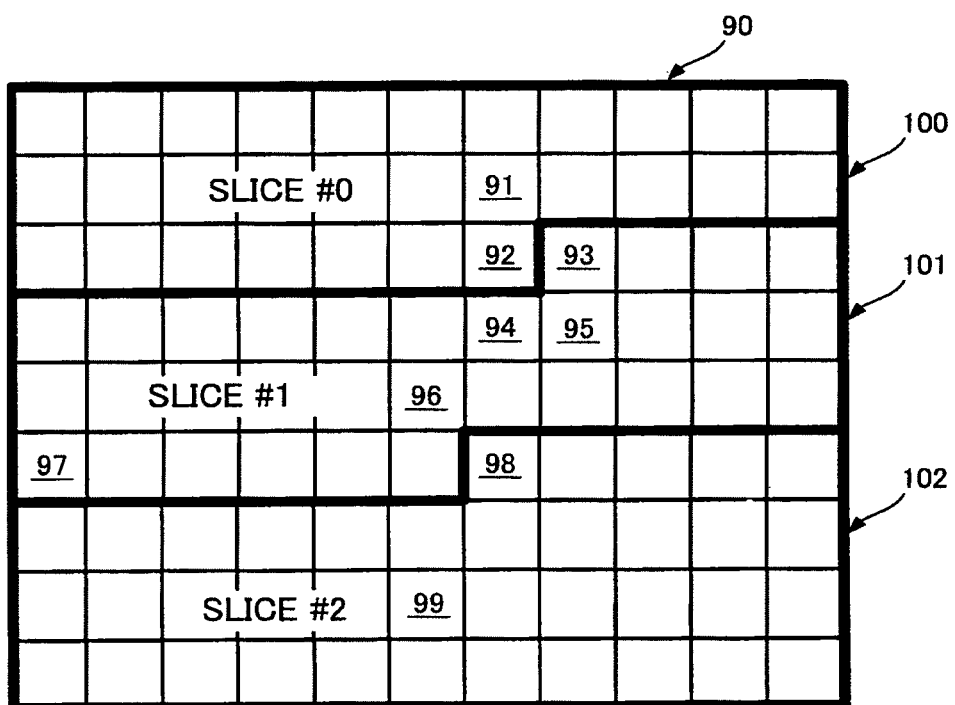
FIG. 3 is a picture showing an exemplary slice structure (prior art)

FIG. 3 shows an exemplary video picture 90 comprising eleven macroblocks in the horizontal direction and nine macroblocks in the vertical direction (nine exemplary macroblocks labeled 91-99). FIG. 3 shows three exemplary slices: a first slice denoted "SLICE #0" 100, a second slice denoted "SLICE #1" 101 and a third slice denoted "SLICE #2" 102. An H.264/AVC decoder may decode and reconstruct the three slices 100, 101, 102 in parallel. At the beginning of the decoding/reconstruction process for each slice, context models are initialized or reset and macroblocks in other slices are marked as unavailable for both entropy decoding and macroblock reconstruction. Thus, for a macroblock, for example, the macroblock labeled 93, in "SLICE #1," macroblocks (for example, macroblocks labeled 91 and 92) in "SLICE #0" may not be used for context model selection or reconstruction. Whereas, for a macroblock, for example, the macroblock labeled 95, in "SLICE #1," other macroblocks (for example, macroblocks labeled 93 and 94) in "SLICE #1" may be used for context model selection or reconstruction. Therefore, entropy decoding and macroblock reconstruction must proceed serially within a slice. Unless slices are defined using flexible macroblock ordering (FMO), macroblocks within a slice are processed in the order of a raster scan.

Flexible macroblock ordering defines a slice group to modify how a picture is partitioned into slices. The macroblocks in a slice group are defined by a macroblock-to-slice-group map, which is signaled by the content of the picture parameter set and additional information in the slice headers. The macroblock-to-slice-group map consists of a slice-group identification number for each macroblock in the picture. The slice-group identification number specifies to which slice group the associated macroblock belongs. Each slice group may be partitioned into one or more slices, wherein a slice is a sequence of macroblocks within the same slice group that is processed in the order of a raster scan within the set of macroblocks of a particular slice group. Entropy decoding and macroblock reconstruction must proceed serially within a slice.

Figure 4:
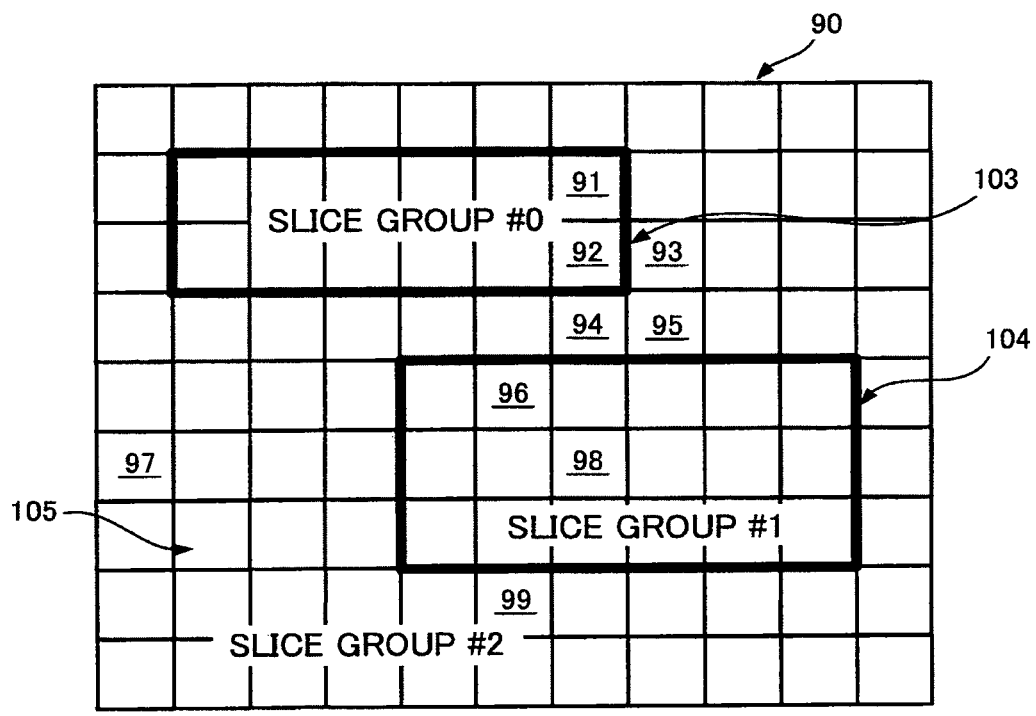
FIG. 4 is a picture showing an exemplary slice group structure (prior art)

FIG. 4 depicts an exemplary macroblock allocation into three slice groups: a first slice group denoted "SLICE GROUP #0" 103, a second slice group denoted "SLICE GROUP #1" 104 and a third slice group denoted "SLICE GROUP #2" 105. These slice groups 103, 104, 105 may be associated with two foreground regions and a background region, respectively, in the picture 90.

Some embodiments of the present invention may comprise partitioning a picture into one or more reconstruction slices, wherein a reconstruction slice may be self-contained in the respect that values of the samples in the area of the picture that the reconstruction slice represents may be correctly reconstructed without use of data from other reconstruction slices, provided that the references pictures used are identical at the encoder and the decoder. All reconstructed macroblocks within a reconstruction slice may be available in the neighborhood definition for reconstruction.

Some embodiments of the present invention may comprise partitioning a reconstruction slice into more than one entropy slice, wherein an entropy slice may be self-contained in the respect that symbol values in the area of the picture that the entropy slice represents may be correctly entropy decoded without the use of data from other entropy slices. In some embodiments of the present invention, the entropy coding state may be reset at the decoding start of each entropy slice. In some embodiments of the present invention, the data in other entropy slices may be marked as unavailable when defining neighborhood availability for entropy decoding. In some embodiments of the present invention, macroblocks in other entropy slices may not be used in a current block's context model selection. In some embodiments of the present invention, the context models may be updated only within an entropy slice. In these embodiments of the present invention, each entropy decoder associated with an entropy slice may maintain its own set of context models.

Some embodiments of the present invention may comprise CABAC encoding/decoding. The CABAC encoding process includes the following steps:

Binarization: A non-binary-valued symbol (for example, a transform coefficient, a motion vector, or other coding data) is converted into a binary code, also referred to as a bin string.

Binarization is followed, for each bin, also considered bit, of the binarized symbol by:

Context Model Selection: A context model is a probability model for one or more bins of the binarized symbol. The context model comprises, for each bin, the probability of the bin being a "1" or a "0." The model may be chosen for a selection of available models depending on the statistics of recently coded data symbols, usually based on the left and above neighboring symbols, if available.

Binary Arithmetic Coding: An arithmetic coder encodes each bin according to the selected probability model and is based on recursive interval subdivision.

Probability Update: The selected context model is updated based on the actual coded value.

In some embodiments of the present invention comprising CABAC encoding/decoding, at the decoding start of an entropy slice, all of the context models may be initialized or reset to predefined models.

Figure 5:
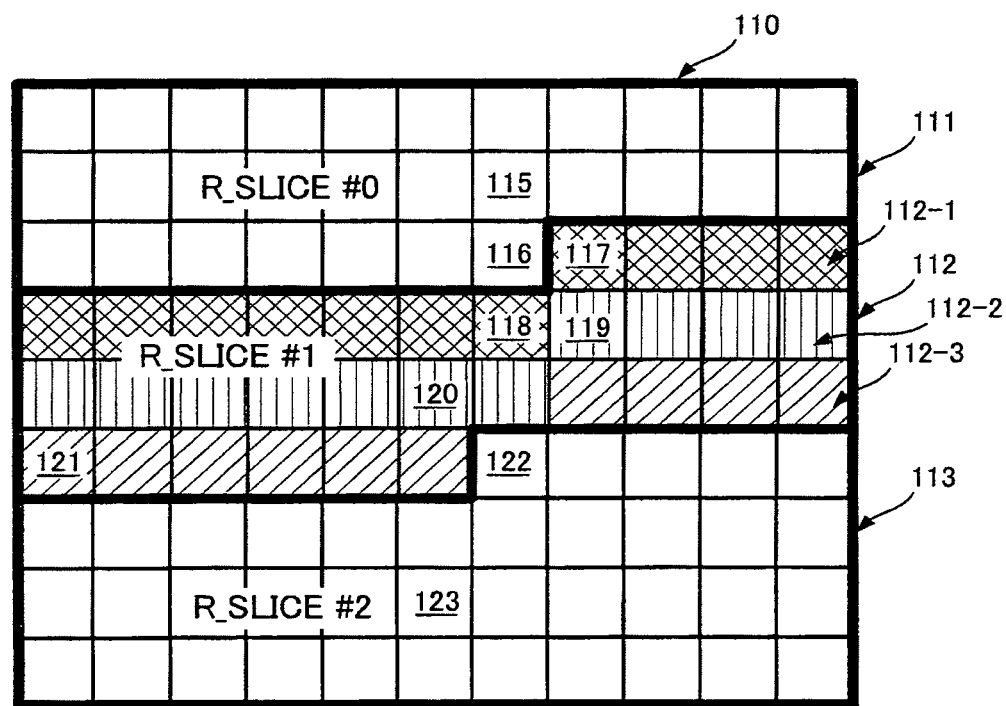
FIG. 5 is a picture showing an exemplary slice partition according to embodiments of the present invention, wherein a picture may be partitioned in at least one reconstruction slice and a reconstruction slice may be partitioned into more than one entropy slice.
Figure 5:
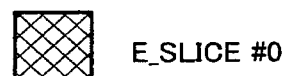
Figure 5:
Figure 5:

Some embodiments of the present invention may be understood in relation to FIG. 5. FIG. 5 shows an exemplary video frame 110 comprising eleven macroblocks in the horizontal direction and nine macroblocks in the vertical direction (nine exemplary macroblocks labeled 115-123). FIG. 5 shows three exemplary reconstruction slices: a first reconstruction slice denoted "R_SLICE #0" 111, a second reconstruction slice denoted "R_SLICE #1" 112 and a third reconstruction slice denoted "R_SLICE #2" 113. FIG. 5 further shows a partitioning of the second reconstruction slice "R_SLICE #1" 112 into three entropy slices: a first entropy slice denoted "E_SLICE #0" shown in cross-hatch 112-1, a second entropy slice denoted "E_SLICE #1" shown in vertical-hatch 112-2 and a third entropy slice denoted "E_SLICE #2" shown in angle-hatch 112-3. Each entropy slice 112-1, 112-2, 112-3 may be entropy decoded in parallel. Here, first entropy slice denoted "E_SLICE #0" and second entropy slice denoted "E_SLICE #1" may also be referred to as first portion and second portion of the bitstream.

In some embodiments of the present invention, only data from macroblocks within an entropy slice may be available for context model selection during entropy decoding of the entropy slice. All other macroblocks may be marked as unavailable. For this exemplary partitioning, macroblocks labeled 117 and 118 are unavailable for context model selection when decoding symbols corresponding to the area of macroblock labeled 119 because macroblocks labeled 117 and 118 are outside of the entropy slice containing macroblock 119. However, these macroblocks 117, 118 are available when macroblock 119 is reconstructed.

In some embodiments of the present invention, an encoder may determine whether or not to partition a reconstruction slice into entropy slices, and the encoder may signal the decision in the bitstream. In some embodiments of the present invention, the signal may comprise an entropy-slice flag (entropy-slice flag in first entropy slice may be referred to as first flag), which may be denoted "entropy_slice_flag" in some embodiments of the present invention.

Figure 6:
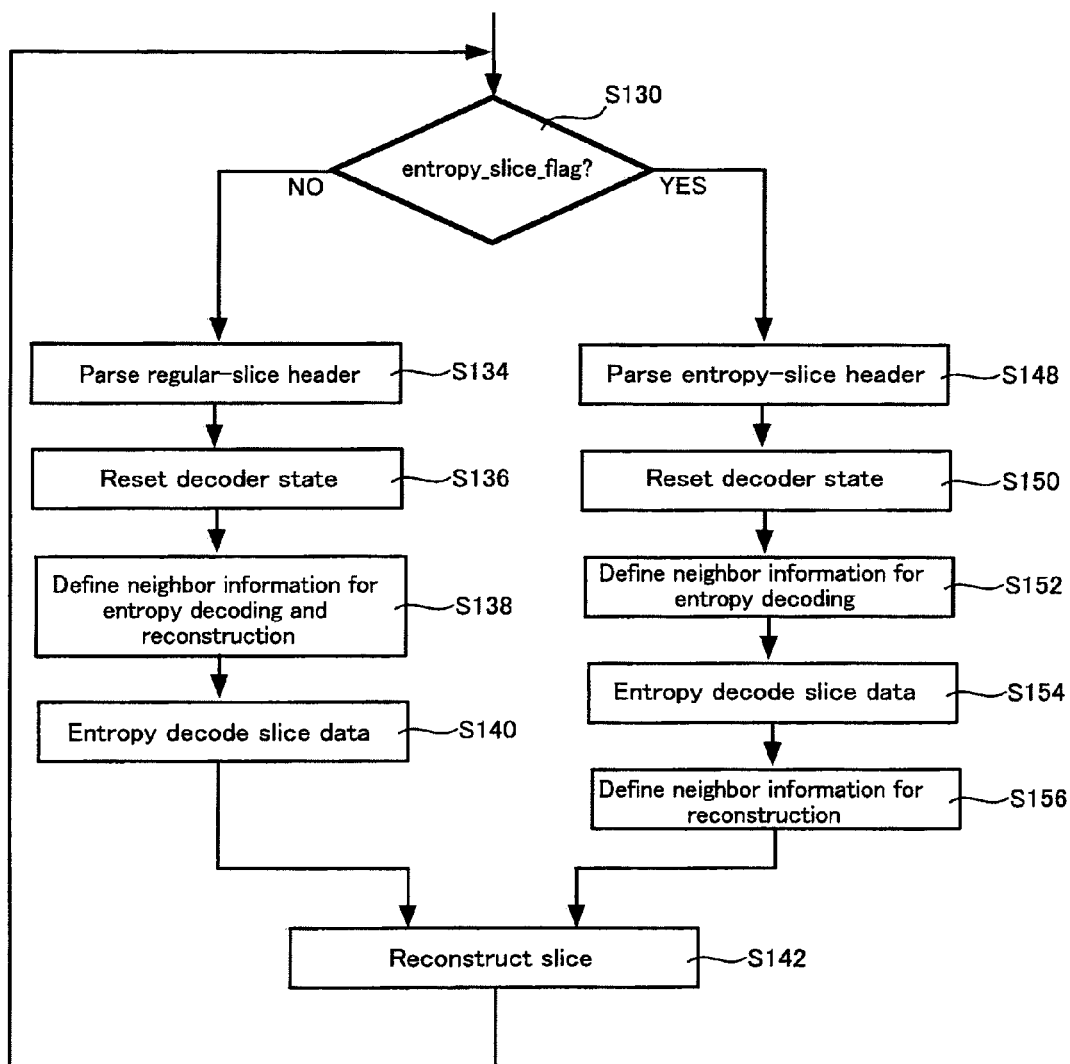
FIG. 6 is chart showing an exemplary embodiment of the present invention comprising an entropy slice.

Some decoder embodiments of the present invention may be described in relation to FIG. 6. In these embodiments, an entropy-slice flag may be examined(S130), and if the entropy-slice flag indicates that there are no entropy slices associated with a picture, or a reconstruction slice (NO in the step S130), then the header may be parsed as a regular slice header(S134). The entropy decoder state may be reset (S136), and the neighbor information for the entropy decoding and the reconstruction may be defined(S138). The slice data may then be entropy decoded(S140), and the slice may be reconstructed(S142). If the entropy-slice flag indicates there are entropy slices associated with a picture(YES in the step S130), then the header may be parsed as an entropy-slice header(S148). The entropy decoder state may be reset (S150), the neighbor information for entropy decoding may be defined(S152) and the entropy-slice data may be entropy decoded(S154). The neighbor information for reconstruction may then be defined(S156), and the slice may be reconstructed(S142). After slice reconstruction in the step S142, the next slice, or picture, may be examined.

Figure 7:
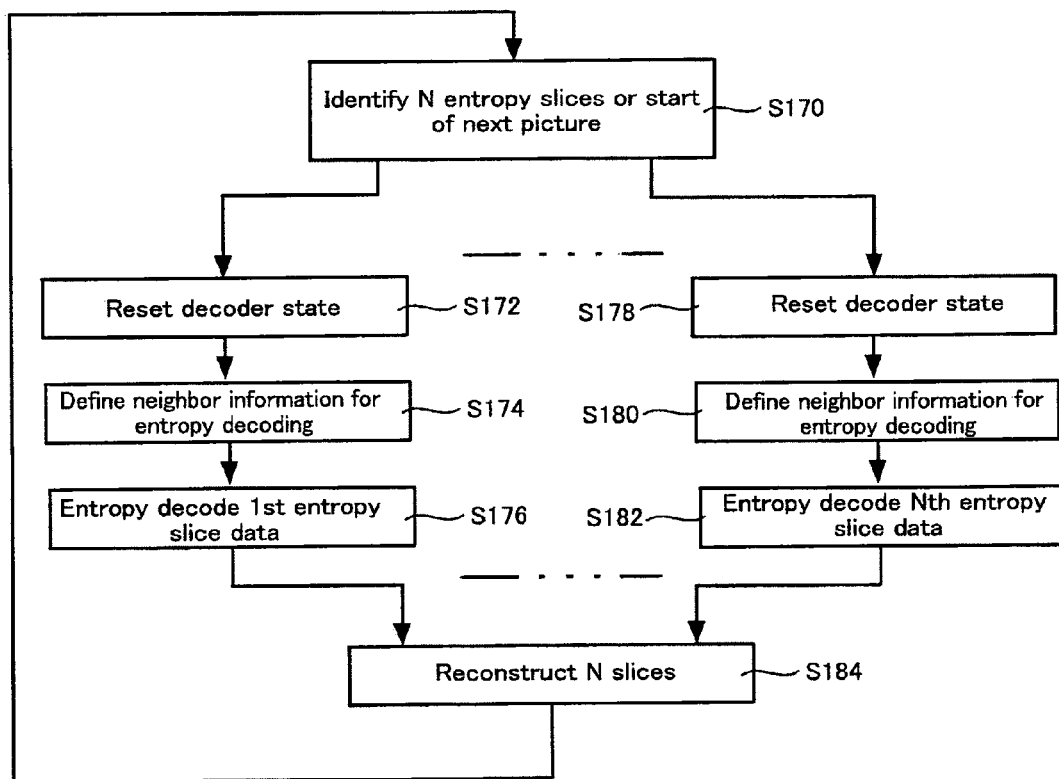
FIG. 7 is a chart showing an exemplary embodiment of the present invention comprising parallel entropy decoding of multiple entropy slices followed by slice reconstruction.

Some alternative decoder embodiments of the present invention may be described in relation to FIG. 7. In these embodiments, the decoder may be capable of parallel decoding and may define its own degree of parallelism, for example, consider a decoder comprising the capability of decoding N entropy slices in parallel. The decoder may identify N entropy slices(S170). In some embodiments of the present invention, if fewer than N entropy slices are available in the current picture, or reconstruction slice, the decoder may decode entropy slices from subsequent pictures, or reconstruction slices, if they are available. In alternative embodiments, the decoder may wait until the current picture, or reconstruction slice, is completely processed before decoding portions of a subsequent picture, or reconstruction slice. After identifying up to N entropy slices in the step of S170, each of the identified entropy slices may be independently entropy decoded. A first entropy slice may be decoded (S172-S176). The decoding of the first entropy slice may comprise resetting the decoder state (S172). In some embodiments comprising CABAC entropy decoding, the CABAC state may be reset. The neighbor information for the entropy decoding of the first entropy slice may be defined (S 174), and the first entropy slice data may be decoded (S176). For each of the up to N entropy slices, these steps may be performed (S178-S182 for the Nth entropy slice). In some embodiments of the present invention, the decoder may reconstruct the entropy slices when all of the entropy slices are entropy decoded(S184). In alternative embodiments of the present invention, the decoder may begin reconstruction in the step of S184 after one or more entropy slices are decoded.

In some embodiments of the present invention, when there are more than N entropy slices, a decode thread may begin entropy decoding a next entropy slice upon the completion of entropy decoding of an entropy slice. Thus when a thread finishes entropy decoding a low complexity entropy slice, the thread may commence decoding additional entropy slices without waiting for other threads to finish their decoding.

In some embodiments of the present invention which may accommodate an existing standard or method, an entropy slice may share most of the slice attributes of a regular slice according to the standard or method. Therefore, an entropy slice may require a small header. In some embodiments of the present invention, the entropy slice header may allow a decoder to identify the start of an entropy slice and start entropy decoding. In some embodiments, at the start of a picture, or a reconstruction slice, the entropy slice header may be the regular header, or a reconstruction slice header.

In some embodiments of the present invention comprising an H.264/AVC codec, an entropy slice may be signaled by adding a new bit, "entropy_slice_flag" to the existing slice header. Table 1 lists the syntax for an entropy slice header according to embodiments of the present invention, wherein C indicates Category and Descriptor u(1), ue(v) indicate some fixed length or variable length coding methods.

"first_mb_in_slice" specifies the address of the first macroblock in the entropy slice associated with the entropy-slice header. In some embodiments, the entropy slice may comprise a sequence of macroblocks.

"cabac_init_idc" specifies the index for determining the initialization table used in the initialization process for the context mode.

TABLE 1

Syntax Table for Entropy Slice Header

| slice_header( ) { | C | Descriptor |
|---|---|---|
|   entropy_slice_flag | 2 | u(1) |
|   if (entropy_slice_flag) { | | |
|     first_mb_in_slice | 2 | ue(v) |
|     if (entropy_coding_mode_flag && | | |
|   slice_type != I && slice_type != SI) | | |
|       cabac_init_idc | 2 | ue(v) |
|     } | | |
|   } | | |
|   else { | | |
|     a regular slice header ... | | |
|   } | | |
| } | | |

In some embodiments of the present invention, entropy decoding a entropy slice may comprise initializing a plurality of context models; and updating the plurality of context models during entropy decoding the entropy slice.

In some embodiments of the present invention, an entropy slice may be assigned a different network abstraction layer (NAL) unit type from the regular slices. In these embodiments, a decoder may distinguish between regular slices and entropy slices based on the NAL unit type. In these embodiments, the bit field "entropy_slice_flag" is not required.

In some embodiments of the present invention, an entropy slice may be constructed by altering the data multiplexing. In some embodiments of the present invention, the group of symbols contained in an entropy slice may be multiplexed the macroblock level. In alternative embodiments of the present invention, the group of symbols contained in an entropy slice may be multiplexed at the picture level. In other alternative embodiments of the present invention, the group of symbols contained in an entropy slice may be multiplexed by data type. In yet alternative embodiments of the present invention, the group of symbols contained in an entropy slice may be multiplexed in a combination of the above.

Some embodiments of the present invention method comprises encoding a video frame in a video sequence, which includes partitioning a frame in a video sequence into at least one reconstruction slice, thereby producing a reconstruction slice; and partitioning the reconstruction slice into a plurality of entropy slices.

Figure 8:
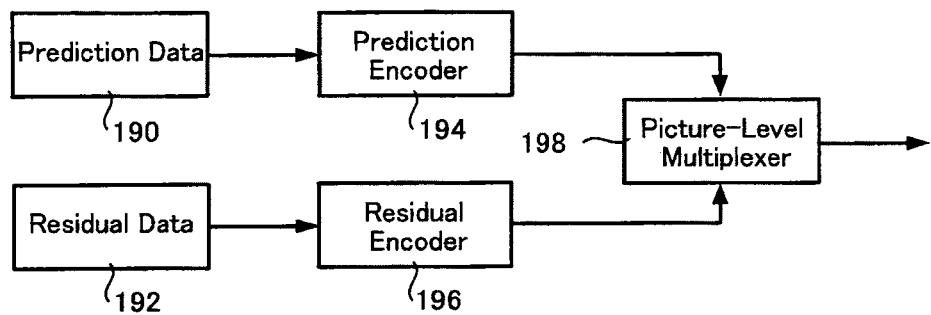
FIG. 8 is a chart showing an exemplary embodiment of the present invention comprising prediction data/residual data multiplexing at the picture level for entropy slice construction.
Figure 9:
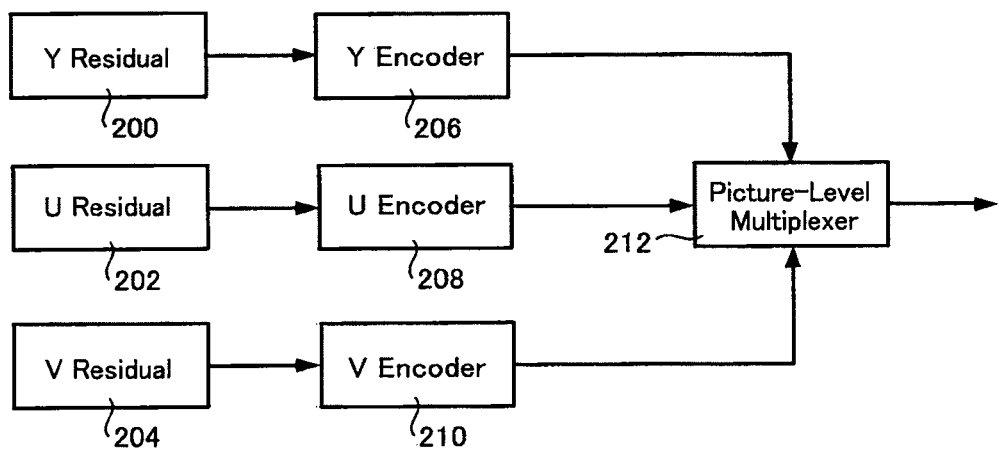
FIG. 9 is a chart showing an exemplary embodiment of the present invention comprising color-plane multiplexing at the picture level for entropy slice construction.

Some embodiments of the present invention comprising entropy slice construction based on picture level multiplexing may be understood in relation to FIG. 8 and FIG. 9. In some embodiments of the present invention shown in FIG. 8, prediction data 190 and residual data 192 may be entropy encoded by prediction encoder 194, and residual encoder 196 separately and multiplexed by picture-level multiplexer 198 at the picture level. In some embodiments of the present invention, the prediction data for a picture 190 may be associated with a first entropy slice, and the residual data for a picture 192 may be associated with a second entropy slice. The encoded prediction data and the encoded entropy data may be decoded in parallel. In some embodiments of the present invention, each partition comprising prediction data or residual data may be partitioned into entropy slices which may be decoded in parallel.

In some embodiments of the present invention shown in FIG. 9, the residual of each color plane, for example, the luma (Y) residual 200 and the two chroma (U and V) residuals 202, 204, may be entropy encoded by Y encoder 206, U encoder 208, and V encoder 210 separately and multiplexed by picture-level multiplexer 212 at the picture level. In some embodiments of the present invention, the luma residual for a picture 200 may be associated with a first entropy slice, the first chroma(U) residual for a picture 202 may be associated with a second entropy slice, and the second chroma residual(V) for a picture 204 may be associated with a third entropy slice. The encoded residual data for the three color planes may be decoded in parallel. In some embodiments of the present invention, each partition comprising color-plane residual data may be partitioned into entropy slices which may be decoded in parallel. In some embodiments of the present invention, the luma residual 200 may have relatively more entropy slices compared to the chroma residuals 202, 204.

Figure 10:
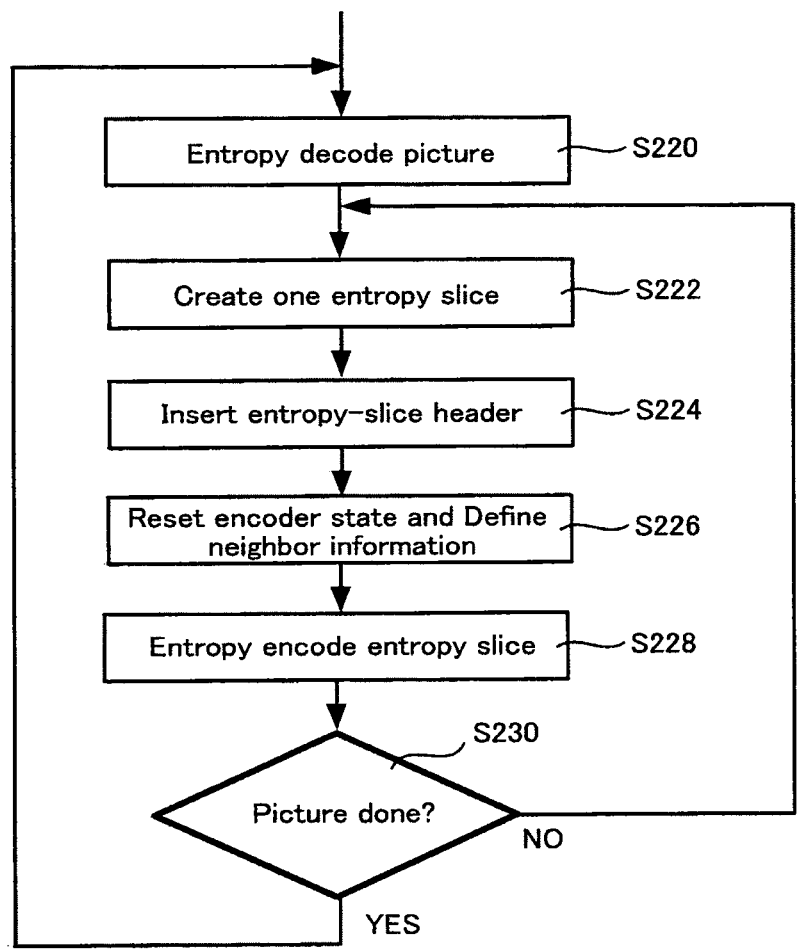
FIG. 10 is a chart showing an exemplary embodiment of the present invention comprising transcoding a bitstream by entropy decoding, forming entropy slices and entropy encoding.

In some embodiments of the present invention, a compressed-video bitstream may be transcoded to comprise entropy slices, thereby allowing for parallel entropy decoding as accommodated by embodiments of the present invention described above. Some embodiments of the present invention may be described in relation to FIG. 10. An input bitstream without entropy slices may be processed picture-by-picture according to FIG. 10. In these embodiments of the present invention, a picture from the input bitstream may be entropy decoded(S220). The data which had been coded, for example, mode data, motion information, residual information and other data, may be obtained. Entropy slices may be constructed one at a time from the data(S222). An entropy-slice header corresponding to an entropy slice may be inserted in a new bitstream(S224). The encoder state may be reset and the neighbor information may be defined (S226). The entropy slice may be entropy encoded 228 and written to the new bitstream. If there is picture data that has not been consumed by the constructed entropy slices(NO in the step S230), then another entropy slice may be constructed in the step of S222, and the process of S224-S230 may continue until all of the picture data has been consumed by the constructed entropy slices(YES in the step S230), and then the next picture may be processed.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

The invention claimed is:

1. A method for decoding a video bitstream, the method comprising:
  a) parsing the video bitstream to identify a first slice header associated with a first portion of a picture in the video bitstream and a second slice header associated with a second portion of the picture, comprising:

analyzing a flag of the first slice header to determine that the first slice header is a regular slice header when the flag is equal to 0, and analyzing a flag of the second slice header to determine that the second slice header is a partitioned slice header when the flag is equal to 1, wherein the second slice header is different than the first slice header and shares some slice attributes with the first slice header, and wherein the size of the second slice header is smaller than the size of the first slice header;

b) entropy decoding the video bitstream, the first slice header and the second slice header to produce a first decoded data associated with the first portion of the picture and a second decoded data associated with the second portion of the picture;

c) reconstructing a first region associated with a picture in the video by using the first decoded data; and d) reconstructing a second region associated with said picture in the video by using the second decoded data and the reconstructed first region based on analyzing the flag of the second slice header to determine that the second slice header is a partitioned slice header.

* * * * *